US011354709B2

United States Patent
Reynolds et al.

(10) Patent No.: US 11,354,709 B2
(45) Date of Patent: Jun. 7, 2022

(54) ATTRIBUTING OFFLINE CONVERSIONS TO ONLINE ACTIVITY

(71) Applicant: VIANT TECHNOLOGY LLC, New York, NY (US)

(72) Inventors: Keith Reynolds, Laguna Hills, CA (US); Ezra Suveyke, New York, NY (US); Nolan Thomas Brown, Pacifica, CA (US)

(73) Assignee: VIANT TECHNOLOGY LLC, Irvine, CA (US)

( * ) Notice: Subject to any disclaimer, the term of this patent is extended or adjusted under 35 U.S.C. 154(b) by 721 days.

(21) Appl. No.: 14/799,353

(22) Filed: Jul. 14, 2015

(65) Prior Publication Data
US 2016/0019603 A1    Jan. 21, 2016

Related U.S. Application Data

(60) Provisional application No. 62/024,645, filed on Jul. 15, 2014.

(51) Int. Cl.
*G06Q 30/02*    (2012.01)

(52) U.S. Cl.
CPC .................... *G06Q 30/0277* (2013.01)

(58) Field of Classification Search
CPC ................................................ G06Q 30/0277
See application file for complete search history.

(56) References Cited

U.S. PATENT DOCUMENTS

| 9,204,257 | B1 * | 12/2015 | Mendelson | G06Q 30/0261 |
| 9,911,136 | B2 * | 3/2018 | Want | H04W 4/02 |
| 10,163,148 | B1 * | 12/2018 | Chatterjee | G06Q 30/0631 |
| 2010/0325659 | A1 * | 12/2010 | Shkedi | G06Q 30/0241 |
| | | | | 725/34 |
| 2011/0191714 | A1 * | 8/2011 | Ting | G06F 3/048 |
| | | | | 715/805 |
| 2011/0231246 | A1 * | 9/2011 | Bhatia | G06Q 30/00 |
| | | | | 705/14.43 |

(Continued)

OTHER PUBLICATIONS

H. Clancy, "Apple's iBeacon signals turning point for mobile engagement", Mar. 1, 2014, Fortune, (Year: 2014).*

(Continued)

*Primary Examiner* — Mario C. Iosif
(74) *Attorney, Agent, or Firm* — Gates & Cooper LLP

(57) ABSTRACT

A method, system, and computer program product provide the ability to connect online and offline activity. Advertisement delivery information is acquired. The advertisement delivery information includes an advertisement identification and a user identification identifying a user to which the advertisement was delivered. Beacon information is acquired. The beacon information includes a beacon identification and location. The beacon identification and the device identification are received from an application executing on a first device associated with the user. The application receives the low energy signal from the beacon identified by the beacon identification. Based on the advertisement delivery information, beacon identification, and device identification, conversion of the advertisement is directly attributed. Conversion information based on the conversion is then provided.

16 Claims, 5 Drawing Sheets

(56) References Cited

U.S. PATENT DOCUMENTS

2015/0018011 A1* 1/2015 Mendelson .......... G01C 21/206
                                                    455/456.3
2015/0278829 A1* 10/2015 Lu ..................... G06Q 30/0201
                                                    705/7.29
2015/0312839 A1* 10/2015 Trehan ................. H04W 76/14
                                                    370/338
2015/0339694 A1* 11/2015 Robbin ............. G06Q 30/0207
                                                    705/14.1
2015/0358760 A1* 12/2015 Kehm .................... H04W 4/80
                                                    455/41.3

OTHER PUBLICATIONS

"iBeacon", Wikipedia, last modified on May 8, 2014. http://en.wikipedia.org/wiki/lbeacon.
"iBeacons 101 proximity marketing with mobile wallet technology", Passkit, downloaded on May 9, 2014. https://passkit.com.

* cited by examiner

ATTRIBUTING OFFLINE CONVERSIONS TO ONLINE ACTIVITY

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/024,645, filed on Jul. 15, 2014, by Keith Reynolds, Ezra Suveyke, and Nolan Thomas Brown, entitled "ATTRIBUTING OFFLINE CONVERSIONS TO ONLINE ACTIVITY,".

BACKGROUND OF THE INVENTION

1. Field of the Invention

The present invention relates generally to advertising, and in particular, to a method, apparatus, and article of manufacture for attributing offline conversions to online activity.

2. Description of the Related Art

Prior art systems have difficulty in attributing offline purchases to online advertising. One problem is the lack of standard identifications between offline and online, resulting in difficulty or inability to join data. For example, third party cookies do not directly relate/join to point of sale (POS) transactions and/or manufacturer coupons. A second problem is the global shift away from third party tracking Such a shift may be due to legal restrictions in the European Union and due to convention in the United States. For example, restrictions may place limits on third party cookie acceptance. Further, the default nature of some browsers (e.g., the Safari™ Web Browser on iOS by Apple™) may only accept first party cookies. A third problem is that mobile device applications (e.g., "apps") do not use cookies. In view of the above, what is needed is the ability to connect offline and online activity through point of sale (POS)/purchase data and television viewership to attribute offline conversions to online activity.

SUMMARY OF THE INVENTION

Embodiments of the invention provide the ability to directly attribute the conversion of an advertisement to a physical presence of a user. A device associated with a user is tracked. Such tracking may be performed using beacons that emit unique signals (e.g., Bluetooth low energy signals). Such tracking enables the determination of the length of time spent by a user within range of the beacon as well as the proximity of the user to the beacon (e.g., based on the strength of the signal received). Such beacons may be placed throughout a physical establishment (e.g., retail store, grocery store, mall, sports stadium, etc.) and be associated with particular subjects/items (e.g., a particular toy/toy aisle in a toy store, a particular brand of clothing within a clothing store, etc.). An application is installed on the user device to enable detection of the beacon signal and transmit those signals (along with an identification of the user device) to a server.

The server has access to information associated with the user device including advertisements delivered to the device and/or other devices associated with the user. The server may also have access to user information such as the user's profile (e.g., via a user data base or social networking application), demographics, etc. Further, the server also has access to information relating to the beacons emitting the signals (e.g., via a client relationship with a retail establishment that installs beacons and identifies/stores the location of such beacons in an accessible database).

The server utilizes the advertising information, user information, and beacon information to directly attribute conversion of the advertisement with the user's physical presence within a proximity of the subject of the advertisement. Thereafter, the server may present conversion information based on the direct attribution. Such conversion information may include further options regarding targeting users as part of an advertising campaign, reports re the success/effectiveness of an advertising campaign to certain users/demographic groups, etc.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention connect offline and online activity through point of sale/purchase (POS) data and television viewership to attribute offline conversions to online activity. Systems of the invention utilize a combination of an advertising server, visitor data, campaign data, an existing house-holding system, and a program running on mobile devices. While the prior art methods attempt to match disparate audience and purchase data with campaign data, embodiments of the invention utilize direct attribution of a conversion via a mobile device to the campaigns served on other devices.

Embodiments of the invention utilize direct attribution of a conversion via a mobile device to the campaigns served on other devices as opposed to the prior art methods that attempt to match disparate audience and purchase data with campaign data.

Hardware Environment

Figure 1:
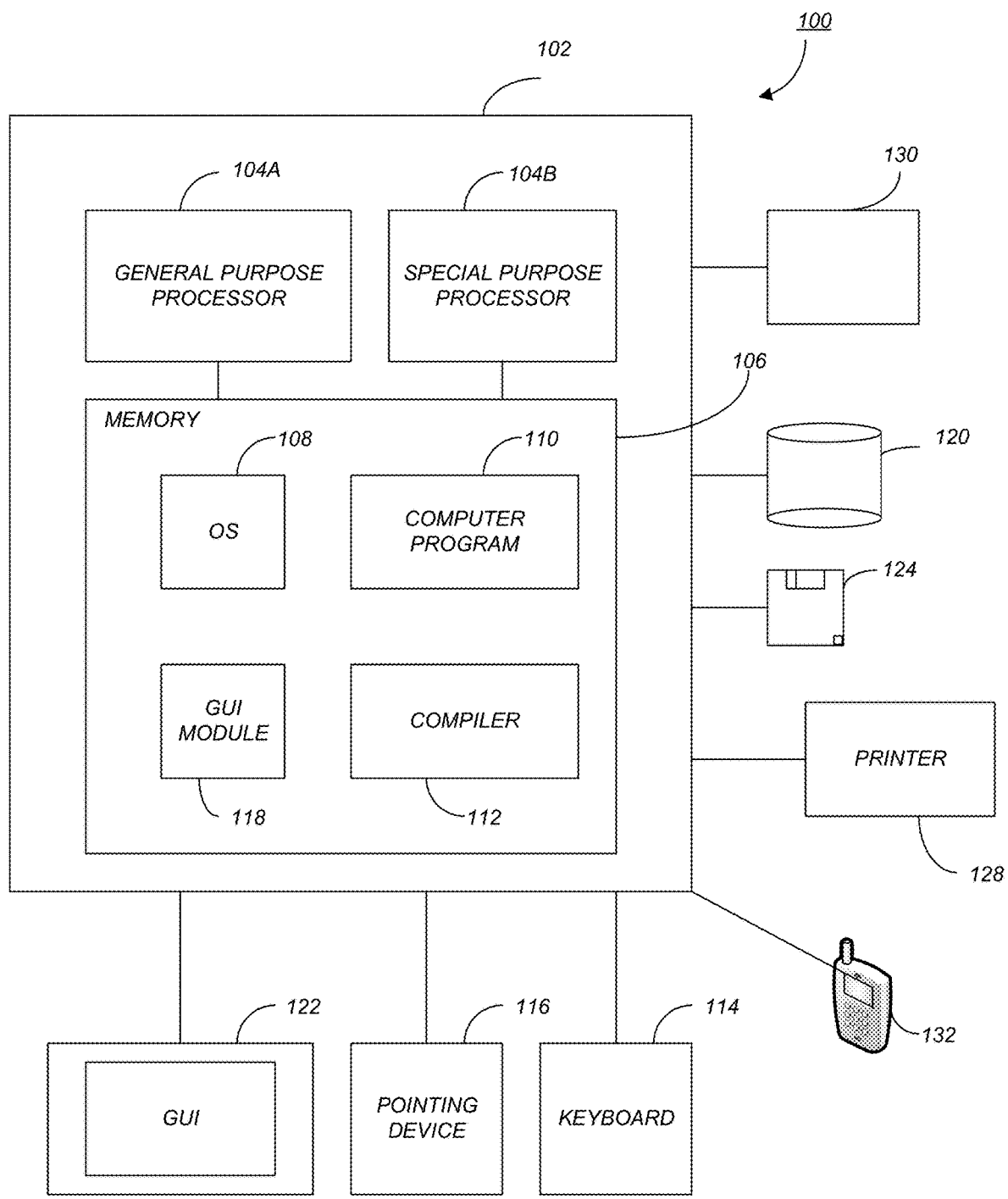
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable device 132 (e.g., an MP3 player, iPod™, Nook™, portable digital video player, cellular device, personal digital assistant, laptop, etc.). In yet another embodiment, the computer 102 or portable device 132 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, wireless network card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
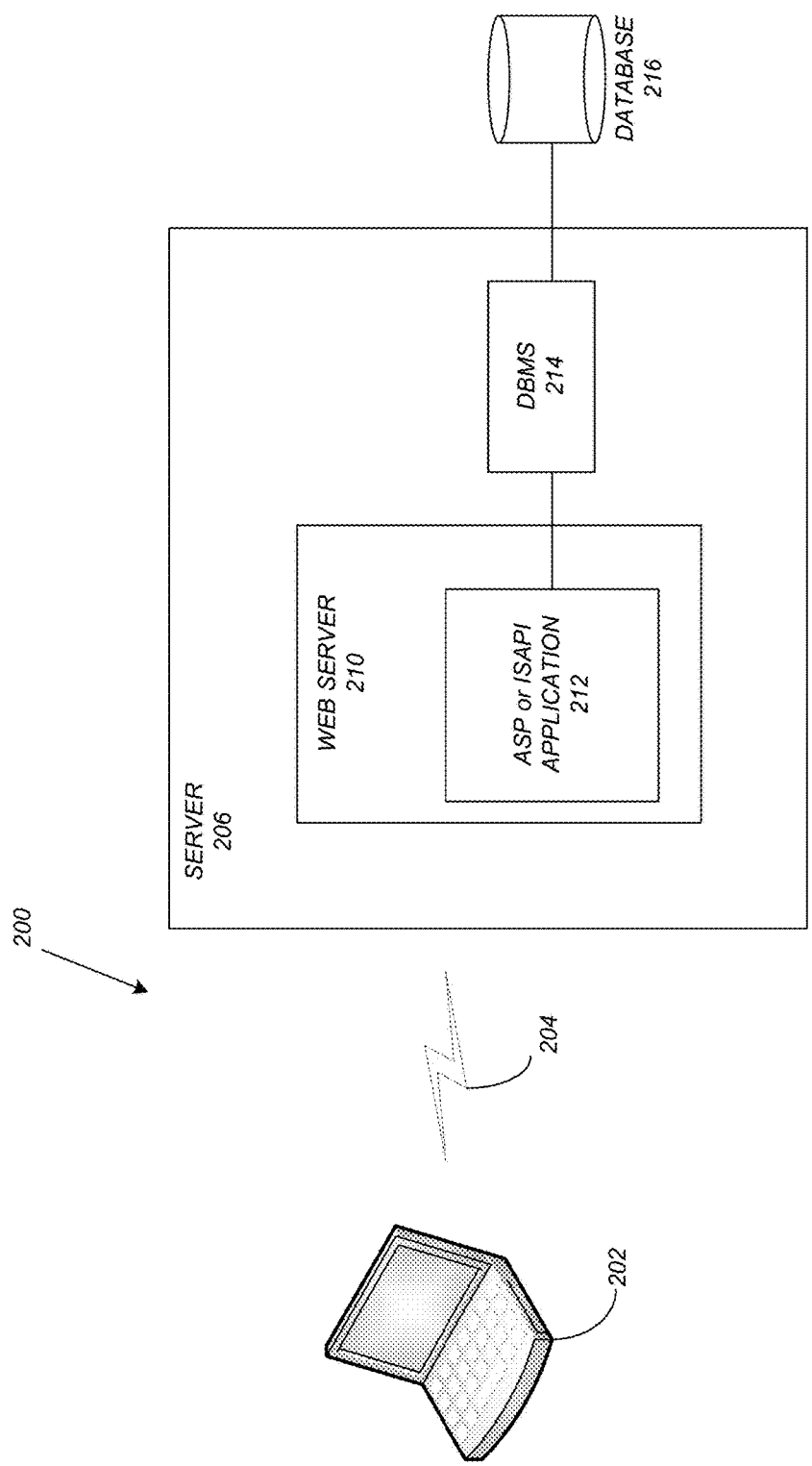
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

As described with respect to FIG. 1, in one or more embodiments, client computer 202 may be a portable device (e.g., portable device 132) in which an "app" or "application" is installed and executing on the portable device 132. As used herein, an app may be a self-contained program or piece of software designed to fulfill a particular purpose and may be designed to execute on smartphones, tablet computers, and other mobile devices. Such apps may be available through application distribution platforms typically operated by the owner of the mobile operating system (e.g., the Apple™ App Store, Google™ Play™, etc.). Apps are usually downloaded from a platform to a target device (such as a smartphone) and may be free or have a cost associated with the purchase and/or use/features/add-ons. Further, an app may communicate with and/or operate in conjunction with a (e.g., server 206) (e.g., via a servlet or other server application executing on server 206).

Generally, these components 202-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Direct Attribution of Conversion

Embodiments of the invention are implemented as a software application on a client 202 or server computer 206. Further, as described above, the client 202 or server computer 206 may comprise a thin client device or a portable device that has a multi-touch-based display (i.e., a tablet device), a mobile phone, a gaming system, an IP (internet protocol) enabled television, a television set top box, or other internet enabled device running on various platforms and operating systems. Users may communicate and interact with the software application using a mobile device, client computer 202, portable device, etc.

Figure 3:
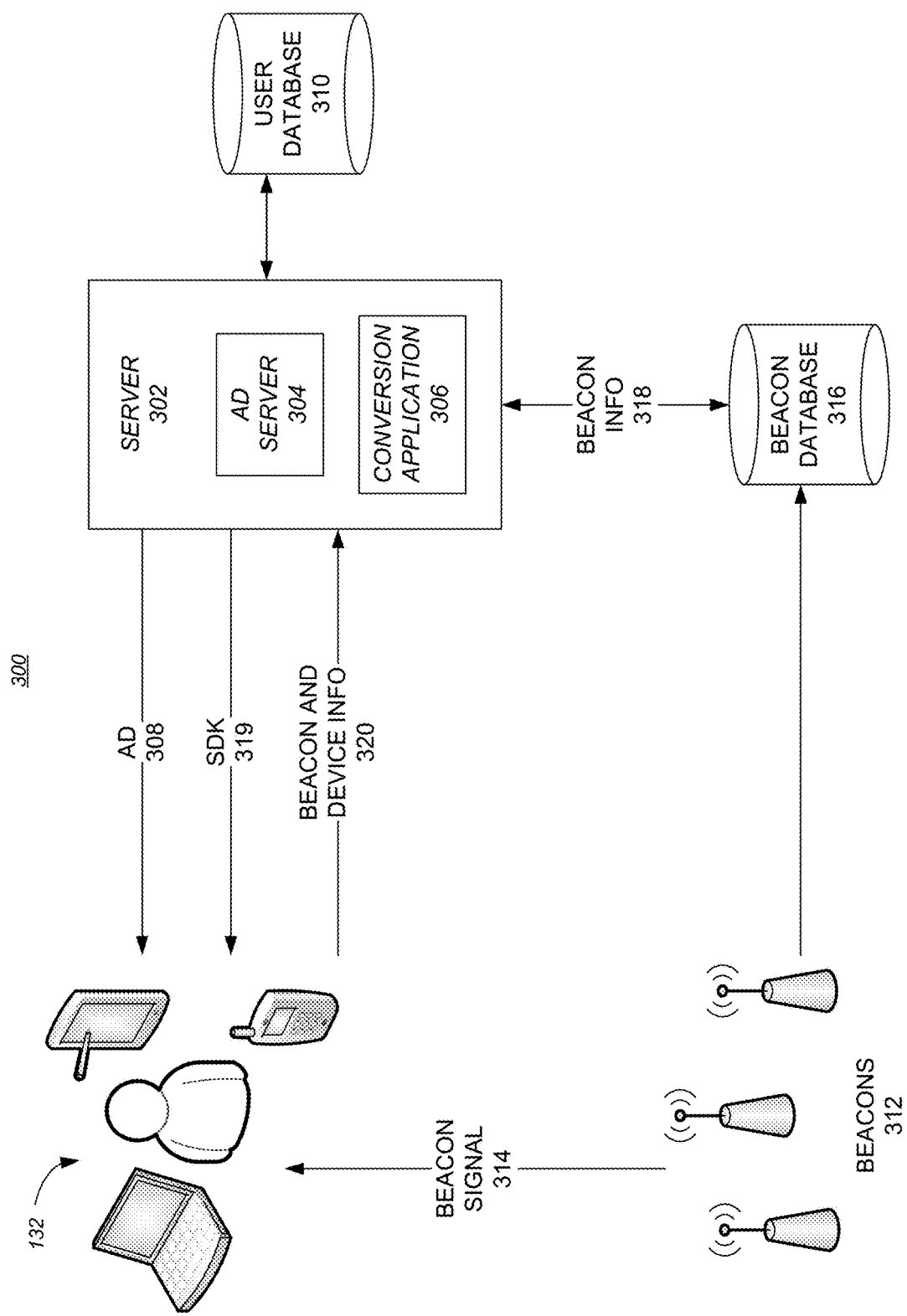
FIG. 3 illustrates the general structure and interaction of a system that enables the ability to provide direct attribution from an advertising campaign to a physical activity that is associated with the campaign in accordance with one or more embodiments of the invention.

FIG. 3 illustrates the general structure and interaction of a system that enables the ability to provide direct attribution from an advertising campaign to a physical activity that is associated with the campaign (e.g., a sale, a browsing of the subject of the advertisement at a retail establishment, etc.). Within system 300, server 302 includes an advertisement server 304 and a conversion application 306. In embodiments of the invention, server 302 may not directly include ad server 304. Instead, ad server 304 may be a second server that delivers advertisements and may communicate information regarding the delivered advertisements to server 302. Advertisements 308 are delivered from ad server 304 to user 132 on various devices (e.g., laptop, tablet, cellular device, television [e.g., internet-enabled television and/or broadcast television], etc.). Information regarding the advertisements delivered may be stored in user database 310. In addition, any profile information about the user 132 (e.g., garnered via advertisements delivered, social media networks, user subscriptions [e.g., cable/satellite television], cellular or land line service, etc.) may also be stored in user database 310.

Advertisements 308 delivered to users 132 may be identified within database 310 by an advertisement identification and a user identification (identifying the user 132 associated with a device to which the advertisement 308 was delivered).

Beacons 312 are configured to emit beacon signals 314 that are received by any device configured to receive such beacon signals 314. Such beacon signals 314 may be low energy signals (e.g., Bluetooth signals). As used herein, the beacons 312 may be iBeacons™ that provide a precise positioning mechanism that transmits a universally unique identifier (UUID) using Bluetooth 4.0 Low Energy (LE). Such signals 314 can be received by Bluetooth LE enabled devices. An iBeacon™ is part of a CoreLocation™ framework within the iOS™ operating system. However, iBeacon™ technology may also be utilized in Android™ and/or other operating systems. iBeacon™ technology enables the receipt of a Bluetooth LE signal based on proximity instead of fixed GPS coordinates. Beacons 312 can be placed on moving objects (e.g., a vehicle such as a food truck) or stationary objects (e.g., a particular location within a retail establishment such as the point of purchase, the candy section, the beer section of a market, the location of a particular brand/item within a retail establishment, etc.). A beacon 312 will constantly emit its UUID within a programmable range (e.g., within a few meters to approximately 50 meters). Details regarding iBeacon™ are described in wikipedia at en.wikipedia.org/wiki/ibeacon (2014) which is incorporated by reference herein.

Beacon information 318 that includes a beacon identification (i.e., the UUID) and the location of the corresponding beacon 312 may be stored in a beacon database 316. Such beacon information 318 may be provided/stored in beacon database 316 by a retail establishment/owner of the beacons 312, by a service that installs/maintains the beacons 312, or by any third party with knowledge of the beacon information 318. Alternatively, or in additional embodiments, the beacon location 312 may be deduced/determined based on user 132 input (e.g., the user 132 inputting/responding to a request for the beacon location). Such a determination may also be automated without requiring particular user input to identify the beacon location. For example, once a product has been purchased, the beacon signal 314 and information received in the user's device may be analyzed to determine/associate the beacon 312 with a particular product or retail establishment (e.g., based on the credit card information charged, product purchased, etc.) In this regard, in addition to or as an alternative to a location, the beacon may be associated with a particular product/retail location.

In view of the above, the particular location of the beacon 312 and/or the particular product/information type associated with the beacon may be known (e.g., by the owner of the retail establishment). Such beacon information 318 may be stored in beacon database 316 and access (and/or authorization to access) to such information may be provided to conversion application 306. Such authorization may be granted by the owner of the establishment in which the beacons 312 are located. Alternatively, the beacon information 318 may be directly provided to server 302.

Server 302 provides/supplies a software development kit (SDK) 319 with one or more applications/apps that are installed on a user device 132. Such an SDK 319 may consist of precompiled code that detects/the beacon signal 314 (e.g., the UUID of one or more beacons 312). The SDK 319 may be a stand-alone application installed on the user device 132 or may be part of any type of application/app installed/to be installed on user device 132.

As a user 132 (i.e., a device of a user) moves, one or more beacon signals 314 (i.e., the UUID of a beacon 312) are received/detected by the SDK 319 (e.g., the SDK 319 within the app on the Bluetooth enabled device receives the low energy blue tooth signal). Once received, the SDK 319 is configured to send beacon and device information (e.g., the beacon identification [e.g. UUID] and the device identification 320 of the device 132 that received the beacon signal 314) to the server 302.

The timing of the delivery of the beacon and device information 320 may based on/in response to receipt/detection of the beacon signal 314 in device 132. Alternatively, the beacon and device information 320 may be transmitted at defined time intervals (e.g., every 5 seconds, 20 seconds, minute, etc.). Further, if no cellular/internet service is available on user device 132, the beacon information 320 may be stored in local memory (or storage) until such service is available at which point the beacon and device information 320 may be transmitted to server 302. Once server 302 receives the beacon and device information 320, it may be stored in user database 310. In addition, if the beacon and device information 320 are received from multiple apps on user device 132, the server 302 may simply cross reference the information based on the device identification (i.e., to merge the information 320 and/or determine the information is coming from a single user device 132 rather than from multiple devices).

In view of the above and as illustrated in FIG. 3, the server 302 has access to both the beacon information 318 (i.e., the location of the beacons), the beacon signals 314 received by user device 132, user device 132 information (e.g., via beacon and device information 320), as well as the advertisements delivered to a user associated with user device 132. Conversion application 306 utilizes all of such information to attribute the advertisement 308 to a physical event/presence (i.e., the user device 132 moving to within a proximity of a beacon signal 314). In other words, the conversion application 306 is able to connect an advertisement 308 delivered to a user 132 with the user's physical presence near a beacon 312 (based on the beacon signal) that is associated with the subject of the advertisement 308. Based on the user's 132 physical presence near a beacon 312 associated with a particular product/service, the conversion application 306 is able to directly attribute the user's 132 physical presence and/or a sale of a product/service with the advertisement 308/advertisement campaign. Such an attribution is referred to herein as a conversion (i.e., a conversion of the advertisement/advertisement campaign to a sale).

Additional factors may also be considered when determining/providing such direct attribution. For example, a viability window may specify a time period within which it is possible to attribute a digital ad impression to a conversion. In other words, the user's physical presence to a product (that is the subject of an advertisement) must occur within a pre-defined time period from when the user viewed the advertisement, in order for such a physical presence to be attributed to the advertisement (and to be considered a "conversion"). Such a time period may be an hour, a day, a week, etc. In alternative embodiments, viability windows may not be taken into account when determining/tracking conversion.

Further information may also be acquired based on the beacon signal 314. Such information may include proximity to a beacon 312. To determine proximity, the SDK 319 and/or server 302 may determine how close the user device 132 is to beacon 312. Proximity information may be categorized as immediate (e.g., touching or very close), near (e.g., within 5-10 feet), or far (e.g., outside of the other proximities—such as farther than 10 feet). The signal strength of the beacon signal 314 may be used to determine such proximity information. The signal strength may also be used to exclude and/or select the closest beacon 312 from amongst several beacons 312 to which the user device 132 is proximate. For example, if multiple beacon signals 314 are received in a user device 132, the strongest signal strength may be used to determine which beacon 312 the user is in the closest proximity to. Either the SDK 319 itself or the server 302 may determine the proximity. In this regard, the strength of the beacon signal 314 may be transmitted with the beacon and device information 320 (i.e., from user device 132 to server 302) such that the server 302 can analyze the signal strength to determine the proximity information.

In addition, the SDK 319 and/or server 302 may determine the length of time the user device 132 is within a proximity of the beacon signal 314. Such length of time information may be combined with the signal strength to determine relevant information and to track time-spent, engagement, etc. For example, if a consistent signal strength is received from a beacon 312 for a period of time, it may be determined that the user is standing still or remaining in proximity to the beacon 312. The length of time and signal strength may be used to track a user device 132 and/or determine/categorize the user's behavior.

An exemplary tracking capability may determine/categorize the user's behavior as a browse, gaze, engage, purchase, or abandon. A browse behavior simply means that the user has walked by a particular beacon 312 at a particular pace (e.g., is within the proximity of a beacon 312 for a defined period of time). A gaze behavior is when the user has stopped (e.g., a consistent signal strength) for a period of time within proximity of a beacon 312 but not enough time to purchase. An engage behavior signifies that the user 132 has looked at a variety of products in the aisle within the physical proximity of the beacon 312 and stayed for some period of time (e.g., consistent strong signal strength for a defined period of time). A purchase behavior signifies that the beacon 312 and user device 132 may have been used to complete a purchase (e.g., touched a mobile device/smart phone 132 to the beacon to complete a purchase transaction). An abandon behavior indicates the user device 132 was within the range of the beacon but walked by it quickly (e.g., on the way to a different section/area of the store).

In view of the above, rather than merely attributing a conversion of an advertisement to a purchase, embodiments of the invention have the ability to attribute the conversion of an advertisement to a variety of user behaviors. Further, fine-grained details regarding the user's interaction with products in a retail establishment may be determined on a passive basis (without any user input) based primarily/solely on the beacon information.

Targeting

In addition to (or in combination with) directly attributing the conversion of an advertisement/advertisement campaign to a physical activity of the user, once a user has been tracked and/or information about the user has been obtained (i.e., based on beacon signal 314 reception), the user can be categorized/associated with particular products/entities. For example, if the beacon and device information 320 indicates that the user has received multiple beacon signals 314 and/or made purchases from a Wal-Mart™ and/or a Starbucks™, the user may be identified as a Wal-Mart™ and/or a Starbucks™ shopper.

Such information may be provided/reported (e.g., in a report/database of statistical information/categorization) to one or more entities. Alternatively, such information may be used to improve/determine which users to target as part of advertising campaigns.

Accordingly, embodiments of the invention leverage all information known about a user online (from all online activities including advertisements presented) into the offline world.

Figure 4:
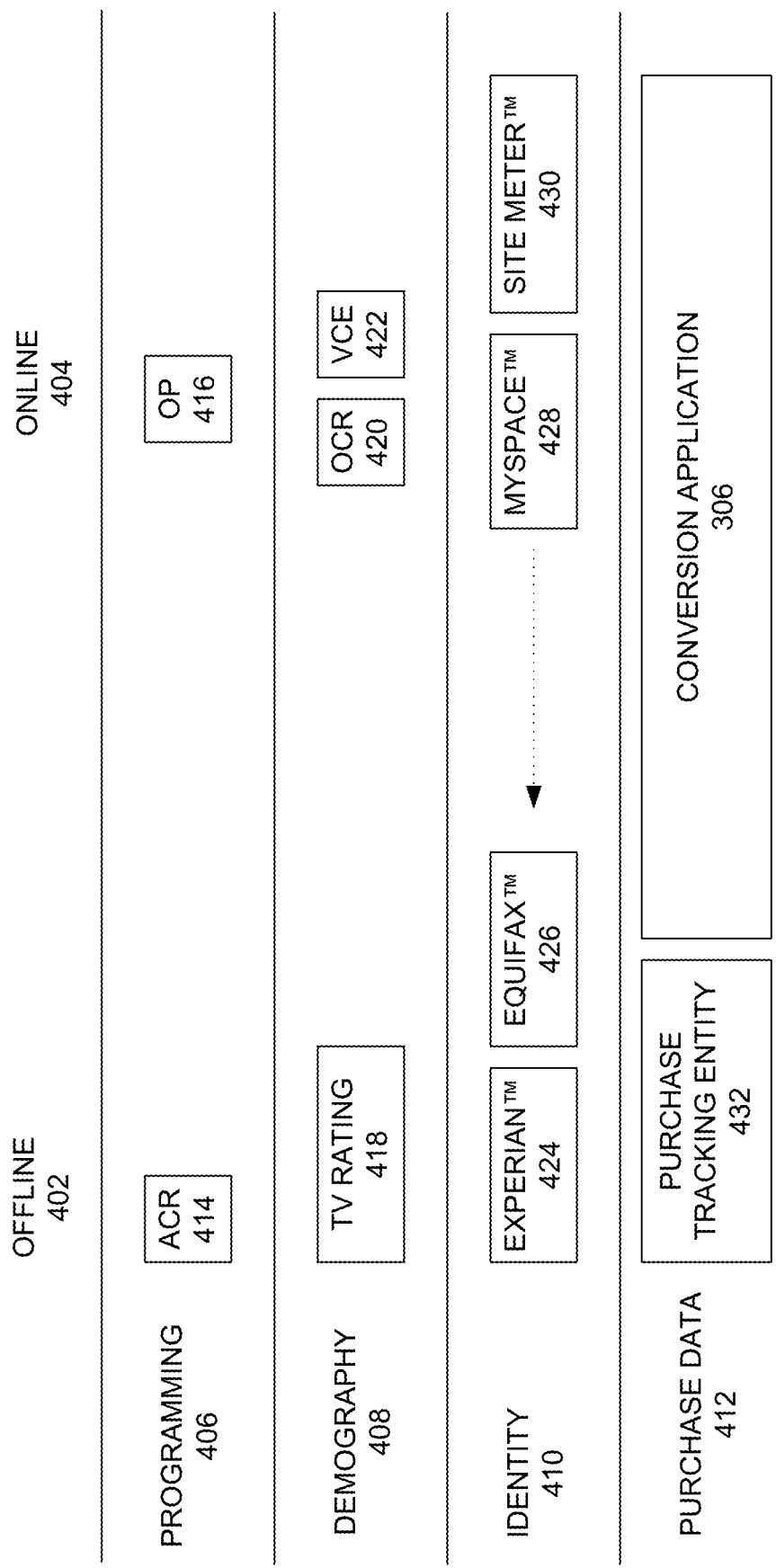
FIG. 4 illustrates the different types of tracking data and the ability to connect offline and online environments in accordance with one or more embodiments of the invention.

FIG. 4 illustrates the different types of tracking data and the ability to connect offline and online environments in accordance with one or more embodiments of the invention.

Offline data 402 and online data 404 may be segmented into four different categories—programming data 406, demography/demographic data 408, identity data 410, and purchase data 412. Programming data 406 provides information/data regarding content delivered (e.g., the name of the program, timing regarding delivery/broadcast/viewing, etc.). Offline 402, programming data 406 requires automatic content recognition (ACR) 414. ACR 414 utilizes a variety of mechanisms to identify content that is displayed/received. For example, an application (e.g., a smartphone app) may enable a device (e.g., via audio coding technology) to uniquely identify a broadcast show, advertisement, audio (e.g., music), etc. ACR 414 may utilize watermarking and/or fingerprinting and/or any other type of content recognition methodologies. Online 404, programming data 406 (i.e. online programming [OP] 416) regarding content is accessible from the transmitting entity.

Demographic data 408 provides information regarding the demographics of the receiving/viewing user. Offline 402, demographic data 408 may rely on television rating information 418 (e.g., available from a rating company such as Nielsen™) to determine the demographics of the recipient. Online 404, demographic data 408 may be determined based on a variety of real-time/online tracking systems. Exemplary systems may include Nielsen's™ online campaign ratings (OCR) tool 420 and/or ComScore's™ validated campaign essentials (VCE) tool 422. OCR tool 420 and VCE tool 422 are smart measurement tools that help advertisers evaluate their digital media and assess which audiences they are reaching using traditional television metrics. Such online 404 tools provide the ability to assess age and gender ratings based on data gathered from various online sources (e.g., social media networks).

Identity data 410 identifies a particular user with demographic and other personal information. Offline 402, identity data may be based on credit reporting agency data such as data from Experian™ 424 and/or Equifax™ 426. Online 404, identity data may utilize a variety of sources such as online social networks (e.g., Myspace™ 428, Facebook™, Twitter™, etc.) and/or a counter/statistics counter source such as that provided by Site Meter™ 430.

Purchase data 412 provides information regarding the purchases made by an individual. In the offline 402 world, purchase data may be provided via a purchase tracking entity 432 (e.g., service provider that tracks purchases such as The Retail Equation [TRE]).

However, in the prior art, there is no ability/capability for bridging the gap between offline 402 and online 404 data. Embodiments of the invention utilize conversion application 306 to bridge this gap and to directly attribute the conversion of an advertisement (shown to a user) to a physical activity related to the subject of the advertisement. Further, as described above, the attribution may provide a variety of conversion behaviors (e.g., browse, gaze, purchase, etc.).

Logical Flow

Figure 5:
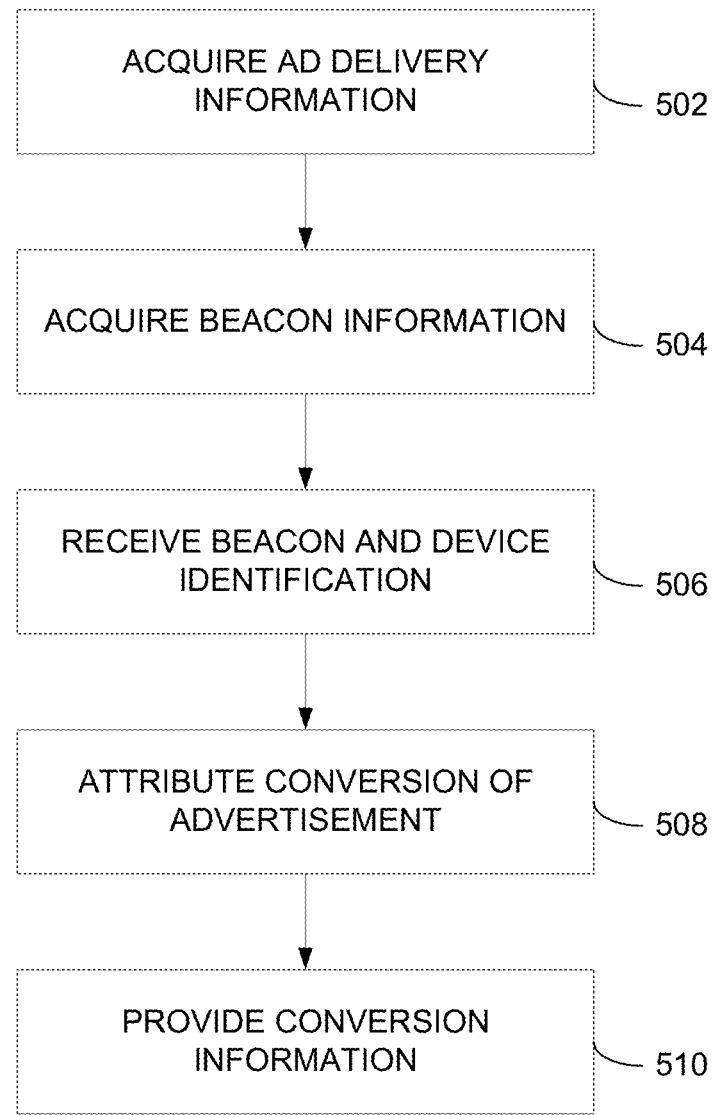
FIG. 5 illustrates the logical flow for connecting online and offline activity in accordance with one or more embodiments of the invention.

FIG. 5 illustrates the logical flow for connecting online and offline activity in accordance with one or more embodiments of the invention.

At step 502, advertisement delivery information is acquired. Such advertisement delivery information includes an advertisement identification identifying an advertisement and a user identification identifying a user to which the advertisement was delivered. The advertisement may be delivered to the user as part of an advertising campaign. Such an advertising campaign may include delivery of advertisement(s) to multiple different devices associated with the user (e.g., a first device such as a mobile/cellular device, a second device such as a television or tablet device, etc.).

At step 504, beacon information is acquired. Such beacon information includes a beacon identification identifying a beacon that emits a low energy signal (e.g., a Bluetooth low energy signal) and a beacon location identifying a location of the beacon with respect to a subject of the advertisement.

At step 506, a server receives, from an application executing on a first device (e.g., a mobile device) associated with the user, the beacon identification and the device identification. The application receives the low energy signal from the beacon identified by the beacon identification. Such an application may be provided by the server to the first device. Further, the application may be a software development kit (SDK) that is installed in an application that has access to a low energy signal receiver of the first device.

At step 508, based on the advertisement delivery information and based on the beacon identification and device identification received from the application, conversion of the advertisement is directly attributed.

At step 510, the conversion information is provided (based on the conversion). Such conversion information may include feedback regarding effective channels for conducting advertising. Further, such conversion information may be utilized to define an advertising campaign that targets the user or other users.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide direct attribution from an advertising campaign to a sale. Advertisers may be benefited by improving the certainty of campaign effectiveness, and enhancing media buying by providing feedback about effective channels. An advertising network may also be benefited with increased targeting capabilities, an ability to charge a substantial premium, and an opportunity to increase total marked share.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for connecting online and offline activity comprising:
   (a) acquiring, in a server, advertisement delivery information, wherein the advertisement delivery information comprises:
      (1) an advertisement identification identifying an advertisement that was delivered, to a user, via online activity of the user;
      (2) a user identification identifying the user to which the advertisement was delivered;
   (b) acquiring beacon information, wherein the beacon information comprises:
      (1) a beacon identification identifying a beacon that emits a low energy signal;
      (2) a beacon location identifying a location of the beacon with respect to a subject of the advertisement;
   (c) receiving, in the server from an application executing on a first device associated with the user, the beacon identification and a device identification, wherein the application received the low energy signal from the beacon identified by the beacon identification, and wherein the application received the low energy signal from the beacon subsequent to delivery of the advertisement to the user;
   (d) determining, in the server, from the beacon information, that the beacon is associated with the subject of the advertisement;
   (e) the server directly attributing an offline conversion to the delivery of the advertisement online, wherein:
      (1) the server has access to the beacon information, the device identification, and the advertisement delivery information;
      (2) the attributing is based on the determining, the advertisement delivery information, the beacon identification and device identification received from the application, and a viability window;
      (3) the directly attributing comprises determining a proximity of the beacon to a physical presence of the user based on a signal strength of the beacon;
      (4) the directly attributing comprises determining a length of time the user is within the proximity of the beacon;
      (5) the directly attributing comprises categorizing a behavior of the user into a category based on a combination of the length of time with the signal strength;
      (6) the categorizing categorizes the behavior of the user as:
         (i) a browse behavior when the user has walked by the beacon at a particular pace, wherein the browse behavior is based on the user within the proximity of the beacon for a first defined period of time;
         (ii) a gaze behavior when the user has stopped for a second defined period of time within the proximity of the beacon, wherein a determination that the user has stopped is based on a consistency of the signal strength;
         (iii) an engage behavior when the user has looked at a variety of products within the proximity of the beacon and stayed for a third defined period of time, wherein the engage behavior is based on a consistency of a signal strength for the third defined period of time;
         (iv) a purchase behavior when the beacon and the first device were used to complete a purchase; and
         (v) an abandon behavior when the user device was within a range of the beacon below a fourth defined period of time;
      (7) the directly attributing comprises directly attributing conversion of the advertisement to the physical presence of the user within the proximity of the beacon that is associated with the subject of the advertisement based on the categorizing;
      (8) the viability window specifies a time period from when the advertisement was delivered to the user to when the beacon information is received; and (9) the viability window must be satisfied in order to directly attribute the conversion; and (f) providing conversion information and the category based on the conversion.

2. The computer-implemented method of claim 1, wherein the application comprises a software development kit (SDK) that is installed in a device application that has access to a low energy signal receiver of the first device.

3. The computer-implemented method of claim 1, wherein the first device comprises a mobile device.

4. The computer-implemented method of claim 1, wherein:
the advertisement is delivered to the user via the first device.

5. The computer-implemented method of claim 1, wherein:
the advertisement is delivered to the user as part of an advertising campaign via a second device that is different from the first device.

6. The computer-implemented method of claim 1, wherein:
the conversion information comprises feedback regarding channels used for conducting advertising.

7. The computer-implemented method of claim 1, wherein the providing conversion information comprises:
utilizing the conversion information to define an advertising campaign that targets the user or other users.

8. The computer-implemented method of claim 1, further comprising:
determining a success of an advertising campaign to the user, based on the conversion information, wherein the advertising campaign contains the advertisement; and
utilizing the success to modify the advertising campaign.

9. A computer system for connecting online and offline activity comprising:
(a) a server computer having a memory; and
(b) a conversion application executing on the server computer, wherein the conversion application is configured to:
 (1) acquire advertisement delivery information, wherein the advertisement delivery information comprises:
  (i) an advertisement identification identifying an advertisement that was delivered, to a user, via online activity of the user;
  (ii) a user identification identifying the user to which the advertisement was delivered;
 (2) acquire beacon information, wherein the beacon information comprises:
  (i) a beacon identification identifying a beacon that emits a low energy signal;
  (ii) a beacon location identifying a location of the beacon with respect to a subject of the advertisement;
 (3) receive, from a client application executing on a first device associated with the user, the beacon identification and a device identification, wherein the client application received the low energy signal from the beacon identified by the beacon identification, and wherein the client application received the low energy signal subsequent to delivery of the advertisement to the user;
 (4) determine, from the beacon information, that the beacon is associated with the subject of the advertisement;
 (5) directly attribute an offline conversion to the delivery of the advertisement online, wherein:

(i) the server has access to the beacon information, the device identification, and the advertisement delivery information;
  (ii) the direct attribution is based on the determination, the advertisement delivery information, the beacon identification and device identification received from the application, and a viability window;
  (iii) the direct attribution determines a proximity of the beacon to a physical presence of the user based on a signal strength of the beacon;
  (iv) the direct attribution determines a length of time the user is within the proximity of the beacon;
  (v) the direct attribution categorizes a behavior of the user into a category based on a combination of the length of time with the signal strength;
  (vi) the behavior of the user is categorized as:
   (A) a browse behavior when the user has walked by the beacon at a particular pace, wherein the browse behavior is based on the user within the proximity of the beacon for a first defined period of time;
   (B) a gaze behavior when the user has stopped for a second defined period of time within the proximity of the beacon, wherein a determination that the user has stopped is based on a consistency of the signal strength;
   (C) an engage behavior when the user has looked at a variety of products within the proximity of the beacon and stayed for a third defined period of time, wherein the engage behavior is based on a consistency of a signal strength for the third defined period of time;
   (D) a purchase behavior when the beacon and the first device were used to complete a purchase; and
   (E) an abandon behavior when the user device was within a range of the beacon below a fourth defined period of time;
  the conversion application directly attributes by directly attributing conversion of the advertisement to a physical presence of the user within a proximity of the beacon that is associated with the subject of the advertisement;
  (vii) the viability window specifies a time period from when the advertisement was delivered to the user to when the beacon information is received; and
  (viii) the viability window must be satisfied in order to directly attribute the conversion; and
 (6) provide conversion information and the category based on the conversion.

10. The computer system of claim 9, wherein the client application comprises a software development kit (SDK) that is installed in a device application that has access to a low energy signal receiver of the first device.

11. The computer system of claim 9, wherein the first device comprises a mobile device.

12. The computer system of claim 9, wherein:
the advertisement is delivered to the user via the first device.

13. The computer system of claim 9, wherein:
the advertisement is delivered to the user as part of an advertising campaign via a second device that is different from the first device.

14. The computer system of claim 9, wherein:
the conversion information comprises feedback regarding channels used for conducting advertising.

15. The computer system of claim 9, wherein the conversion application is configured to provide conversion information by:
utilizing the conversion information to define an advertising campaign that targets the user or other users.

16. The computer system of claim 9, further comprising an advertising application:
determining a success of an advertising campaign to the user, based on the conversion information, wherein the advertising campaign contains the advertisement; and
utilizing the success to modify the advertising campaign.

* * * * *